United States Patent
Telmos (10) Patent No.: US 10,384,760 B2
(45) Date of Patent: Aug. 20, 2019

(54) SELF-ADJUSTING DOOR JAMB FOR AN AIRCRAFT DOOR

(71) Applicant: Gulfstream Aerospace Corporation, Savannah, GA (US)

(72) Inventor: Robert J. Telmos, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 213 days.

(21) Appl. No.: 14/792,231

(22) Filed: Jul. 6, 2015

(65) Prior Publication Data

US 2017/0008608 A1    Jan. 12, 2017

(51) Int. Cl.
| | |
|---|---|
| *B64C 1/14* | (2006.01) |
| *E06B 1/60* | (2006.01) |
| *B64D 11/00* | (2006.01) |

(52) U.S. Cl.
CPC .......... *B64C 1/1461* (2013.01); *B64C 1/1469* (2013.01); *B64D 11/0023* (2013.01); *E06B 1/6084* (2013.01); *Y02T 50/46* (2013.01)

(58) Field of Classification Search
CPC ....... B64C 1/10; B64C 1/1469; B64C 1/1461; B64C 1/1438; B64C 1/1423; B64C 1/6084; B64C 1/6038; B64C 1/6023
See application file for complete search history.

(56) References Cited

U.S. PATENT DOCUMENTS

| | | | |
|---|---|---|---|
| 2,223,338 A | 12/1940 | Curren | |
| 4,911,219 A * | 3/1990 | Dalrymple | B64C 1/1438 244/129.5 |
| 4,989,808 A * | 2/1991 | Spraggins | B64C 1/1438 244/118.5 |
| 6,186,444 B1 * | 2/2001 | Steel | B64C 1/1423 244/129.5 |
| 7,441,726 B2 * | 10/2008 | Melberg | B64C 1/1469 244/129.4 |
| 2006/0145007 A1 | 7/2006 | Melberg et al. | |
| 2007/0051048 A1 * | 3/2007 | Krohn | B64C 1/1469 49/413 |
| 2009/0152398 A1 | 6/2009 | Risch | |
| 2015/0210373 A1 * | 7/2015 | Guimont | B64C 1/1469 244/129.5 |

FOREIGN PATENT DOCUMENTS

| | | |
|---|---|---|
| DE | 7836937 U1 | 4/1979 |
| EP | 0857846 A1 | 8/1998 |
| FR | 2411949 A1 | 7/1979 |
| JP | H0849472 A | 2/1996 |

OTHER PUBLICATIONS

German Patent and Trade Mark Office, Search Report for German Patent Application No. 10 2016 111 873.7 dated Apr. 5, 2017.

* cited by examiner

*Primary Examiner* — Richard R. Green
(74) *Attorney, Agent, or Firm* — LKGlobal | Lorenz & Kopf, LLP (57) ABSTRACT

The disclosed embodiments relate to an aircraft having an interior door with a self-adjusting door jamb. The self-adjusting door jamb includes a door jamb configured to receive the interior door and a bias mechanism coupled to the door jamb and facilitating movement of the door jamb along an axis. Additionally, an angular translating mechanism coupled to the bias mechanism and facilitating angular displacement of the door jamb relative to the axis.

20 Claims, 14 Drawing Sheets

SELF-ADJUSTING DOOR JAMB FOR AN AIRCRAFT DOOR

TECHNICAL FIELD

Embodiments of the present invention generally relate to aircraft, and more particularly relate to door systems for an aircraft.

BACKGROUND OF THE INVENTION

Modern business aircraft typically include a well-appointed passenger cabin for the safety and comfort of aircraft passengers. Within the passenger cabin, areas or compartments are defined by bulkheads, which may include a slidable (or pocket) door to separate one area from an adjoining area for privacy. However, due to stresses applied to the fuselage during flight, it is possible for gaps to appear between the slidable door and the door jamb. These gaps are both unappealing and may permit light penetration or a private conversation to be heard in the adjoining compartment.

Accordingly, it is desirable to provide an aircraft bulkhead door that resists the formation of gaps during flight. It is further desirable that the sliding bulkhead door be adaptable to compensate for differing stress levels applied to the fuselage during flight. Other desirable features and characteristics will become apparent from the subsequent summary and detailed description and the appended claims, taken in conjunction with the accompanying drawings and the foregoing technical field and background.

SUMMARY

The disclosed embodiments relate to an aircraft having an interior door with a self-adjusting door jamb. The self-adjusting door jamb includes a door jamb configured to receive the interior door and a bias mechanism coupled to the door jamb and facilitating movement of the door jamb along an axis. Additionally, an angular translating mechanism coupled to the bias mechanism and facilitating angular displacement of the door jamb relative to the axis.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following description.

The disclosed embodiments relate to an aircraft having an interior door with a self-adjusting door jamb. Accordingly to non-limiting embodiments, the self-adjusting door jamb resists the formation of gaps between the sliding door and the door jamb during flight. The self-adjusting door jamb includes a door jamb configured to receive the interior door and a bias mechanism coupled to the door jamb and facilitating movement of the door jamb along an axis. Additionally, an angular translating mechanism facilitates angular displacement of the door jamb relative to the axis. This action provides the self-adjusting door jamb with multiple axes movement to compensate for stresses applied to the fuselage of the aircraft along two axes and resist the appearance of gaps forming between the sliding door panel and the door jamb.

Figure 1:
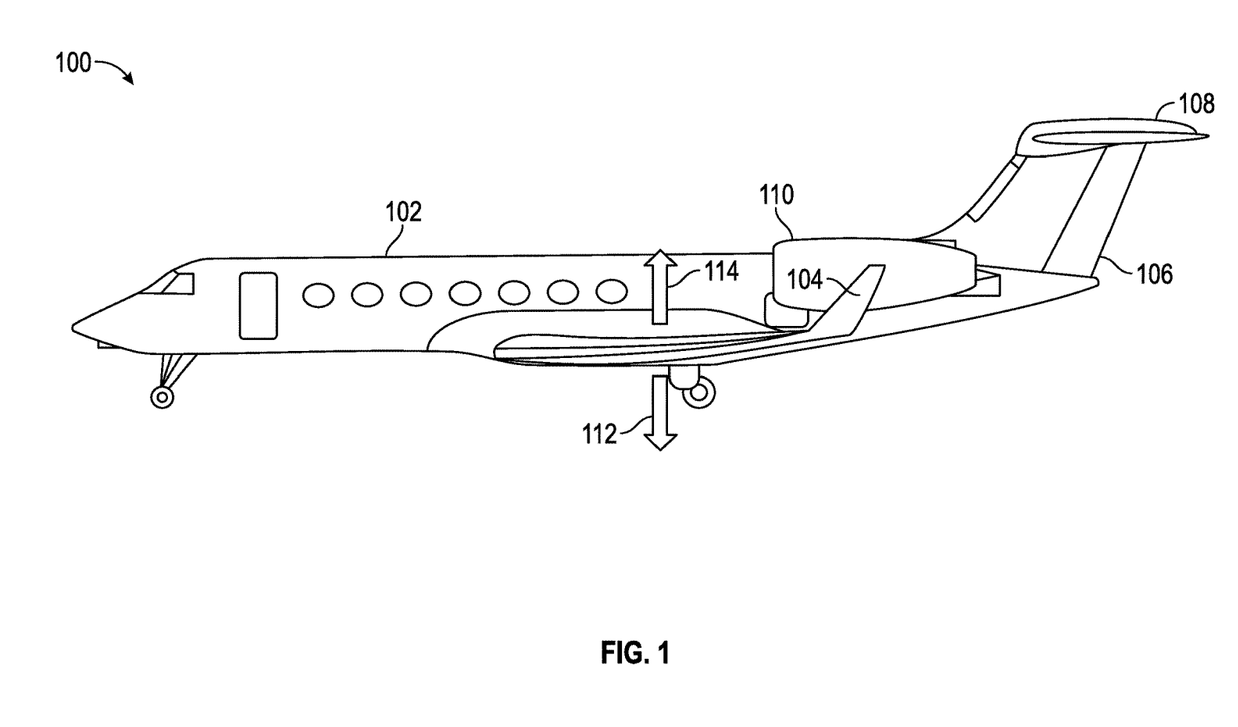
FIG. 1 is a view of an aircraft in which the disclosed embodiments can be implemented in accordance with a non-limiting implementation.

FIG. 1 is a view of an aircraft 100 in which the disclosed embodiments can be implemented in accordance with exemplary, non-limiting implementations. In accordance with non-limiting implementations of the disclosed embodiments, the aircraft 100 includes fuselage 102, which holds the passengers and the cargo; two main wings 104, which provide the lift needed to fly the aircraft 100; a vertical stabilizer 106 and two horizontal stabilizers 108, which are used to ensure a stable flight; and two engines 110, which provide the thrust needed to propel the aircraft 100 forward. Flight control surfaces are placed on wings 104, vertical stabilizer 106 and the horizontal stabilizers 108 to guide the aircraft 100. When the aircraft is at rest, the effects of gravity on of the wings 104 of the aircraft 100 apply a downward stress as indicated by arrow 112, which is applied to the fuselage 102. However, during flight, lift forces overcome gravitational forces and apply an upward force on the wings 104 as indicated by arrow 114. This results in a change of the direction and potentially the magnitude of the force applied to the fuselage 104. Additionally, turbulence or other atmospheric conditions may apply varying forces to the fuselage during flight. These forces may cause some deformation of the shape of the fuselage as compared to the aircraft at rest position. This deformation may be translated into bulkhead walls or other structural members of the passenger cabin and cause gaps to appear between interior doors and their mating surfaces. Some passengers consider these gaps to be unattractive and limit privacy during flight.

Figure 2:
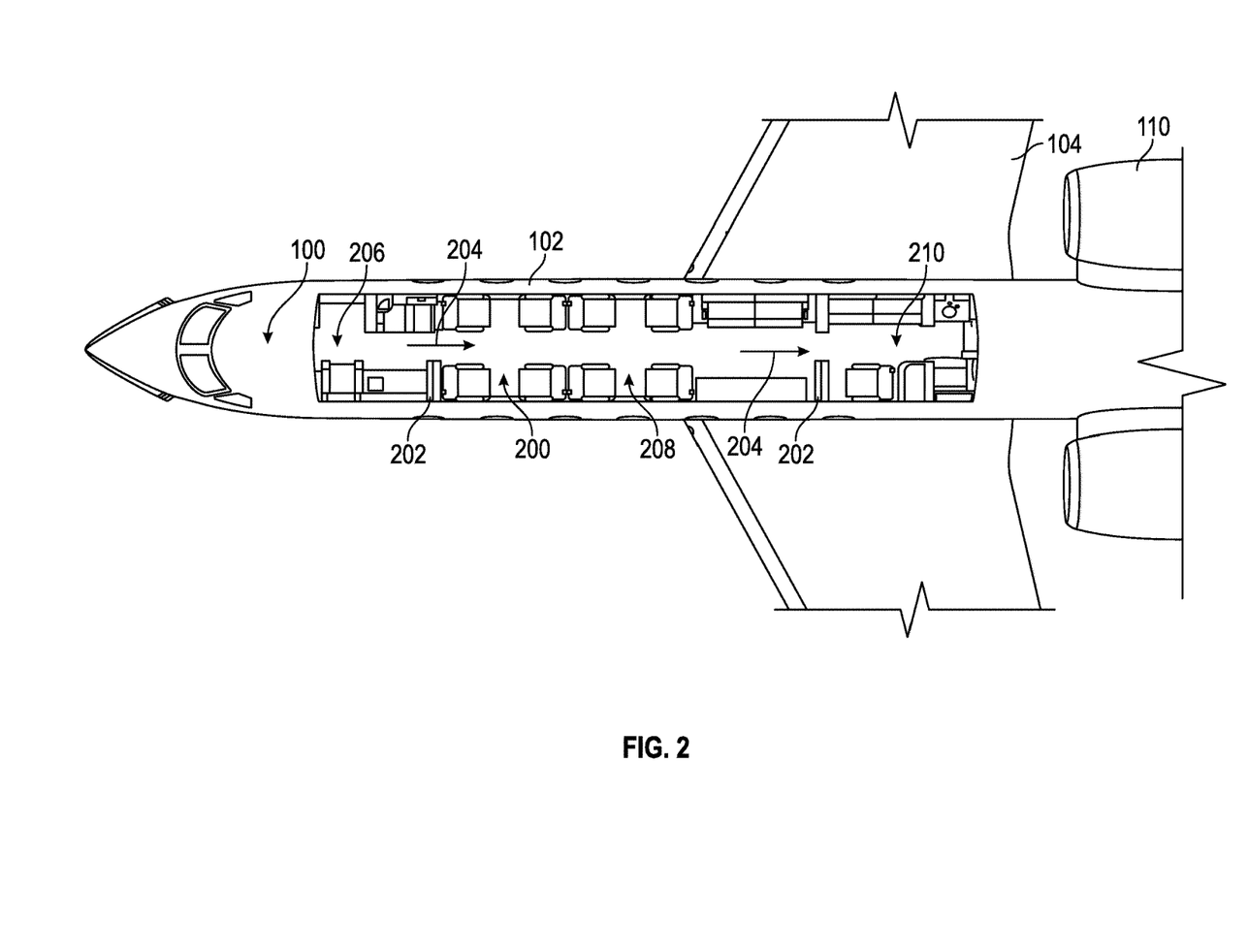
FIG. 2 is a cut-away view of the aircraft of FIG. 1 in accordance with one non-limiting implementation.

FIG. 2 is a cut-away view of the aircraft 100 to illustrate the passenger cabin 200. The passenger cabin 200 has various areas or compartments defined by bulkheads 202. In the non-limiting example of FIG. 2, three compartments are defined by the bulkheads 202; a galley area 206, a general seating area 208 and a private seating area 210. The bulkheads 202 have an opening 204 to permit passage between the various compartments 206, 208 and 210. According to non-limiting embodiments, one or both of the bulkheads 202 include a sliding (or pocket) door to close one area from an adjacent area for privacy or to reduce noise. The present invention provides an improved sliding door that resist gaps from forming between the door and the door jamb during flight as will be discussed below.

Figure 3:
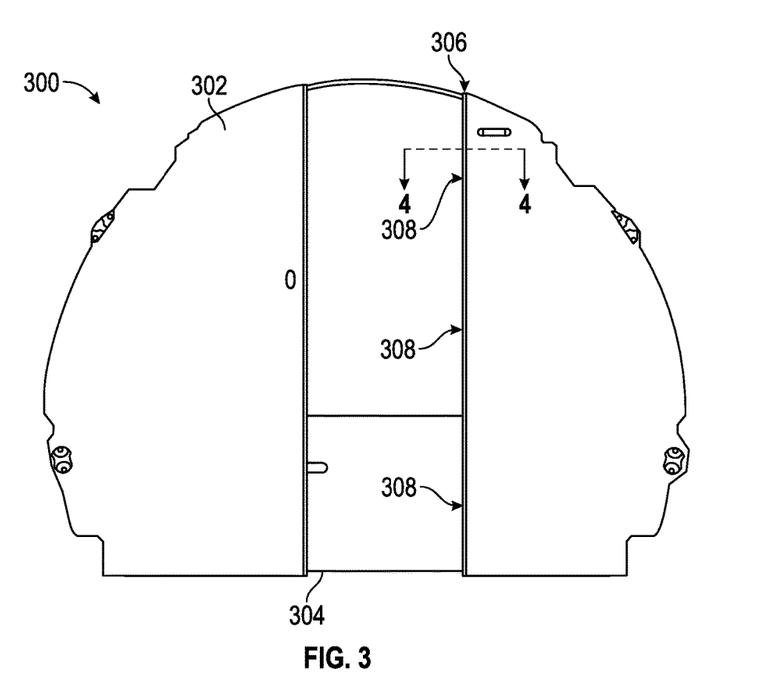
FIG. 3 is an illustration of a bulkhead and aircraft door in accordance with an exemplary implementation of a first disclosed embodiment.

FIG. 3 is an illustration of one non-limiting embodiment of a slidable bulkhead door system 300 that offers the advantages of the present invention. The slidable door system 300 includes a bulkhead 302 and a slidable door panel 304 that resides in an opening (or pocket) in the bulkhead when in the open position. When the slidable door panel 304 is in the closed position, an edge of the slidable door panel contacts a door jamb 306. According to exemplary embodiments, the door jamb 306 includes a bias mechanism that biases the door jamb to remain in contact with the edge of the slidable door panel during flight of the aircraft. Depending on the particular implementation, one or more of these bias mechanisms may be employed to maintain sufficient force across the length of contact (height of the door) to keep the door jamb 306 in contact with the slidable door panel 304 notwithstanding varying stress-induced forces that may be applied to the fuselage and/or bulkhead 302 during air travel. In a non-limiting example, FIG. 3 illustrates possible locations of three such bias mechanisms positioned as shown at 308.

Figure 4:
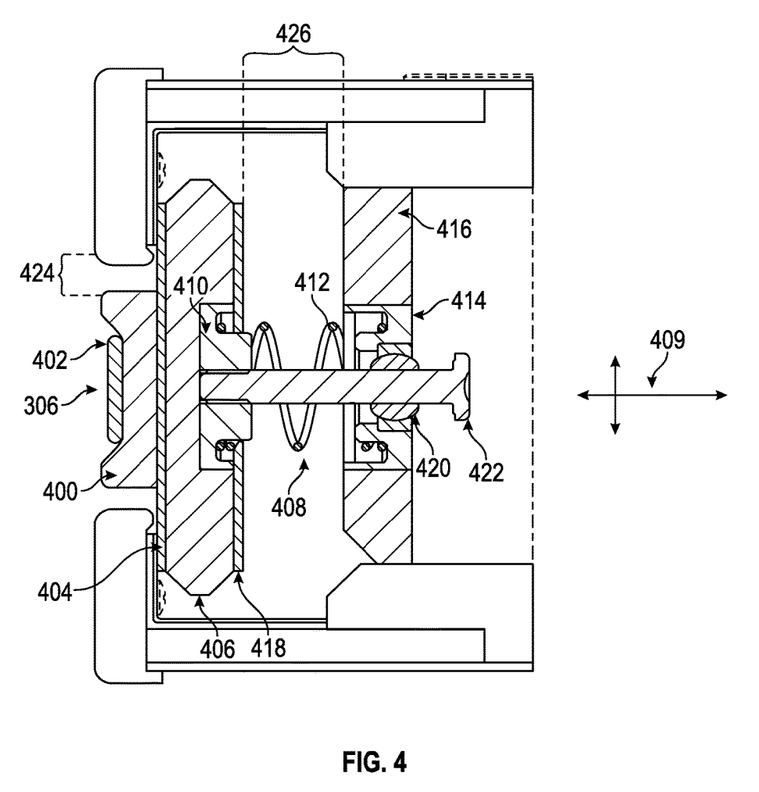
FIG. 4 is an overhead view taken alone section line 4-4 of FIG. 3 with the self-adjusting door jamb in a first position.
Figure 5:
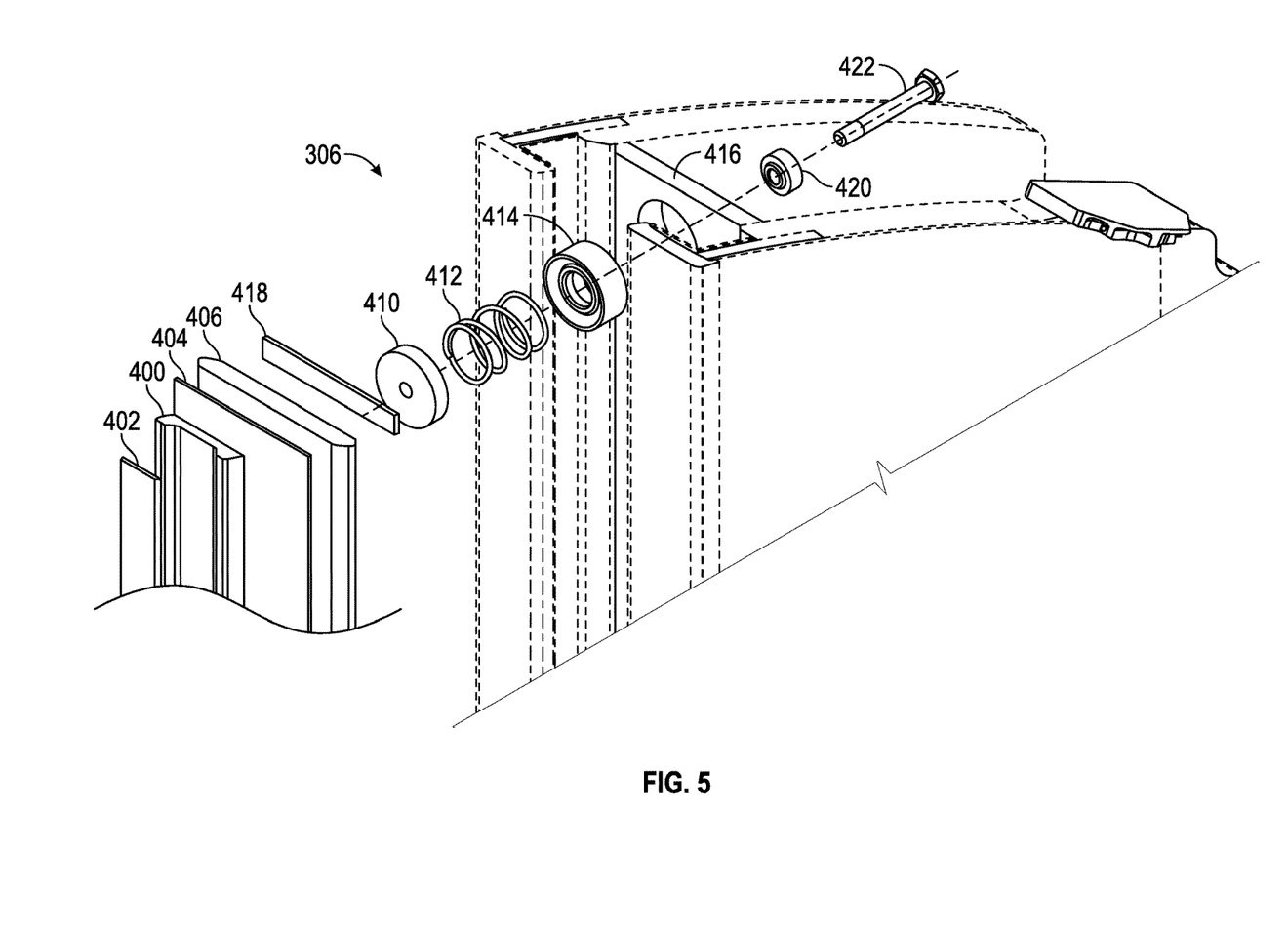
FIG. 5 is an exploded view of the self-adjusting door jamb in accordance with the first disclosed embodiment.

FIG. 4 is a sectional view of one embodiment of the self-adjusting door jamb 306 taken a long section line 4-4. As illustrated in FIG. 4, the self-adjusting door jamb 306 includes a door jamb 400, which may include a door seal 402. The door jamb 400 is coupled to a panel 406 by a veneer 404. Since the door jamb 400, door seal 402 and veneer 404 are visible when the self-adjusting door jamb 306 is installed, some embodiments make these elements decorative or made of wood, composite or plastic material selected to match the interior trim of the aircraft. The panel 406 receives one end of a biasing mechanism 408. In some embodiments, the panel 406 is made of a "honeycomb" construction to provide sufficient rigidity while still reducing weight of the panel 406. The biasing mechanism 408 comprises a retainer 410 that is received by the panel 406, a spring/compression device 412, and a retainer 414 that is received by panel 416. As will be appreciated by those skilled in the art, other spring configurations, compressible bushing or other biasing arrangements may be employed without departing from the teachings of the present disclosure. Panel 416 may also be manufactured using a "honeycomb" construction to reduce weight. A cushion member 418 is positioned between panel 406 and 416 to eliminate noise should the panels contact each other during movement of the panel 406 toward the panel 416. The cushion member 418 could be comprised of a compliant material or felt depending upon the particular implementation. Retainer 414 also receives an angular translating mechanism 420 that allows angular displacement of a fastener 422. In some embodiments, the angular translating mechanism 420 comprises a spherical bearing.

In operation, when the sliding door panel 304 moves toward the closed position and comes into contact with the door jamb 400, the biasing mechanism 408 is compressed to maintain contact with the sliding door panel during flight of the aircraft. The compression causes movement along an axis 409 causing the panel 406 to move towards the panel 416 closing the space 426 between the panels. Additionally, the axial translating mechanism 420 allows angular displacement of the door jamb 400 within a space 424 provided between the door jamb 400 and the bulkhead 302. As will be appreciated by those skilled in the art, this action provides the self-adjusting door jamb with multiple axes movement to compensates for stresses applied to the fuselage of the aircraft along two axes and resist the appearance of gaps forming between the sliding door panel (not shown in FIG. 4) and the door jamb 400. The embodiment illustrated in FIG. 4 is referred to as a wide door receiver since the self-adjusting door jamb assembly can reside and move within a portion of the bulkhead as shown in FIG. 5 which illustrates the self-adjusting door jamb 306 and exploded form.

Figure 6:
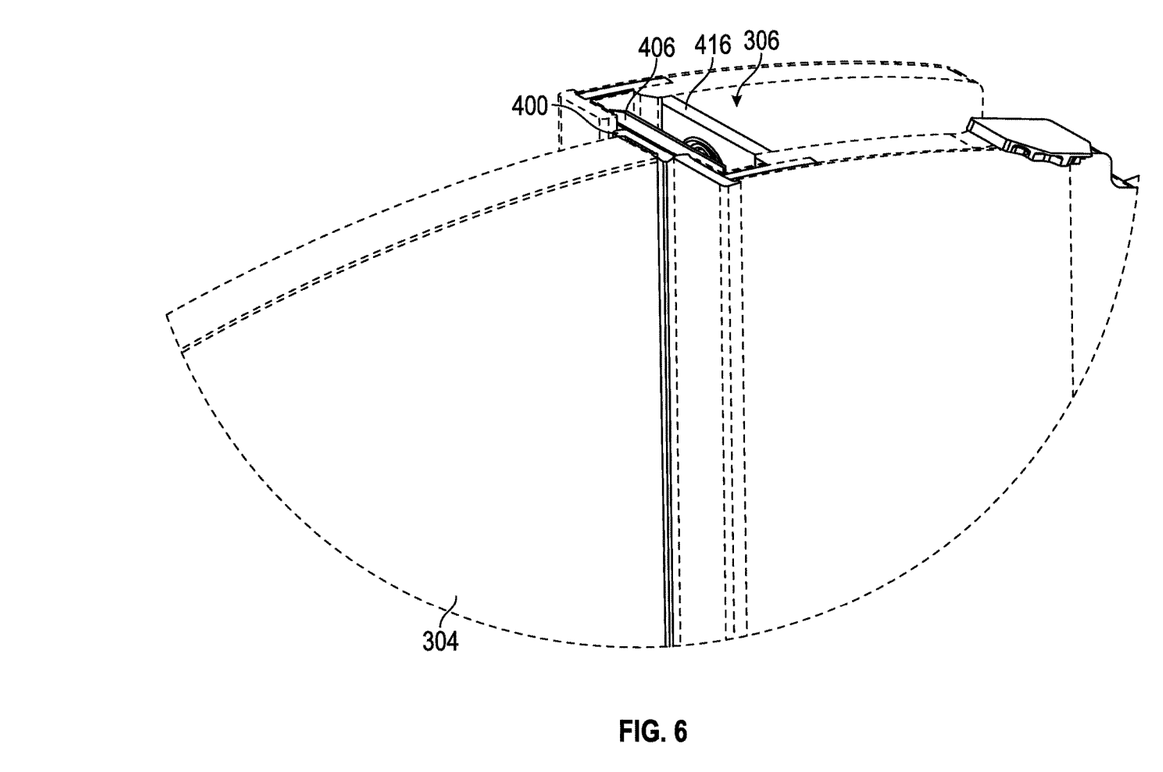
FIG. 6 is a perspective view of FIG. 4 in accordance with the first disclosed embodiment.

FIG. 6 illustrates the self-adjusting door jamb 306 in perspective view just in contact with the sliding door panel 304 where the panels 406 and 416 are spaced apart and not yet compressed.

Figure 7:
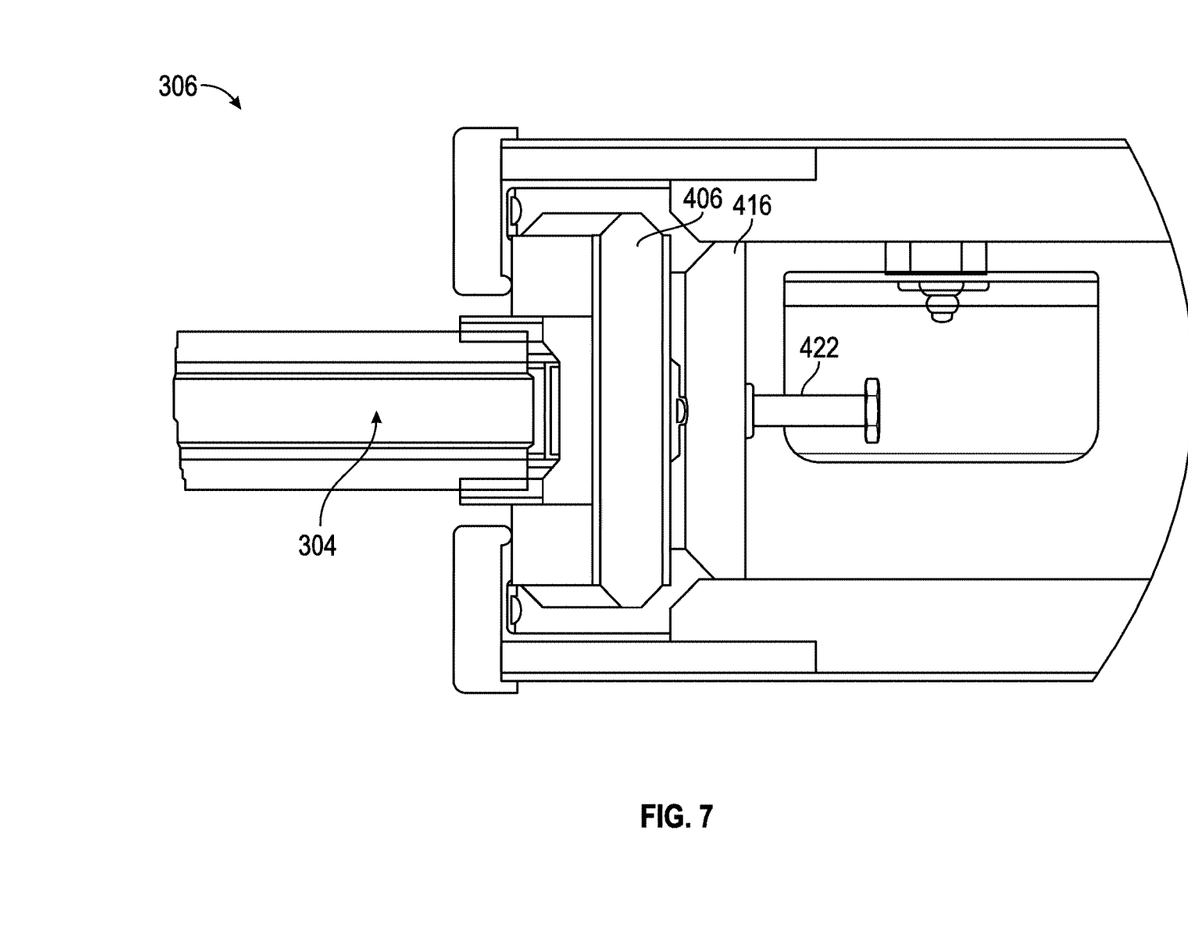
FIG. 7 is an overhead view taken alone section line 4-4 of FIG. 3 with the self-adjusting door jamb in a second position in accordance with the first disclosed embodiment.

FIG. 7 is a top cut-away view of the self-adjusting door jamb 306 in a compressed (closed) position where panel 406 has been pressed toward panel 416 against the force of the bias mechanism (not shown in FIG. 7).

Figure 8:
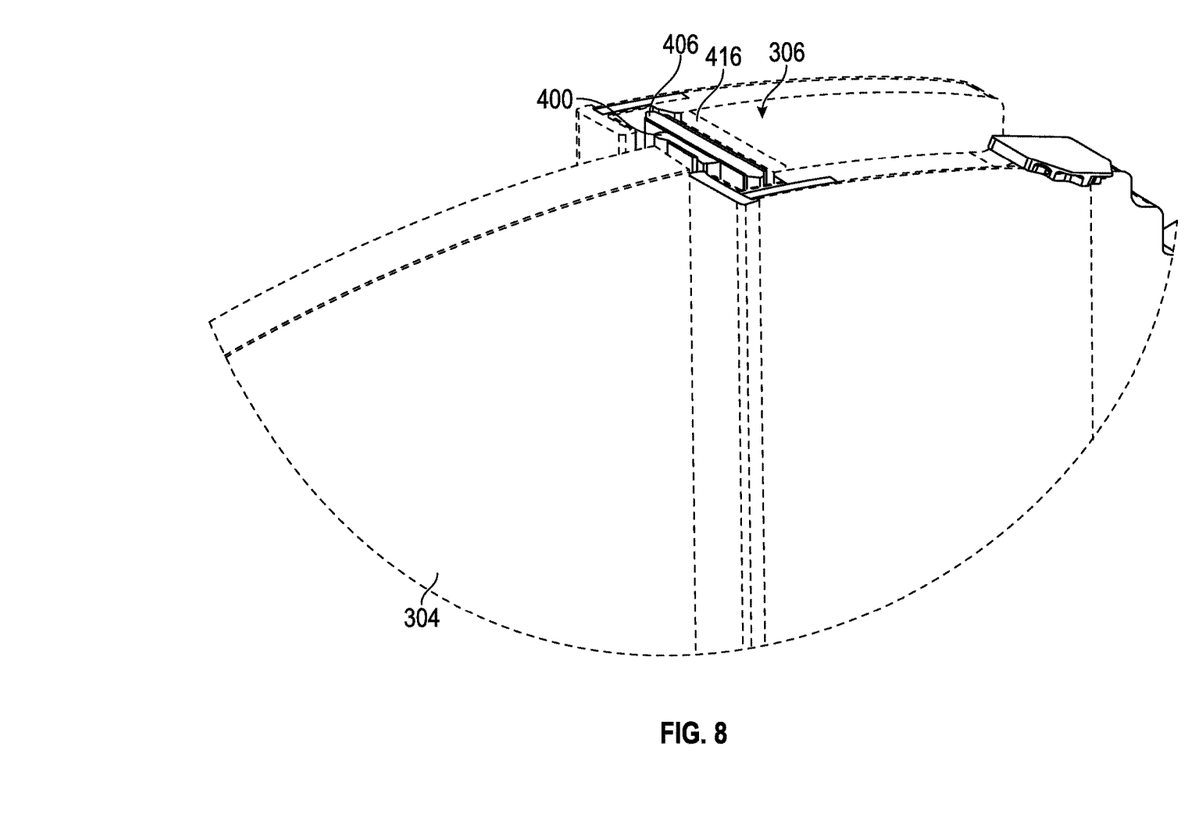
FIG. 8 is a perspective view of FIG. 7 in accordance with the first disclosed embodiment.

FIG. 8 is a perspective view of the self-adjusting door jamb 306 in the compressed position.

Figure 9:
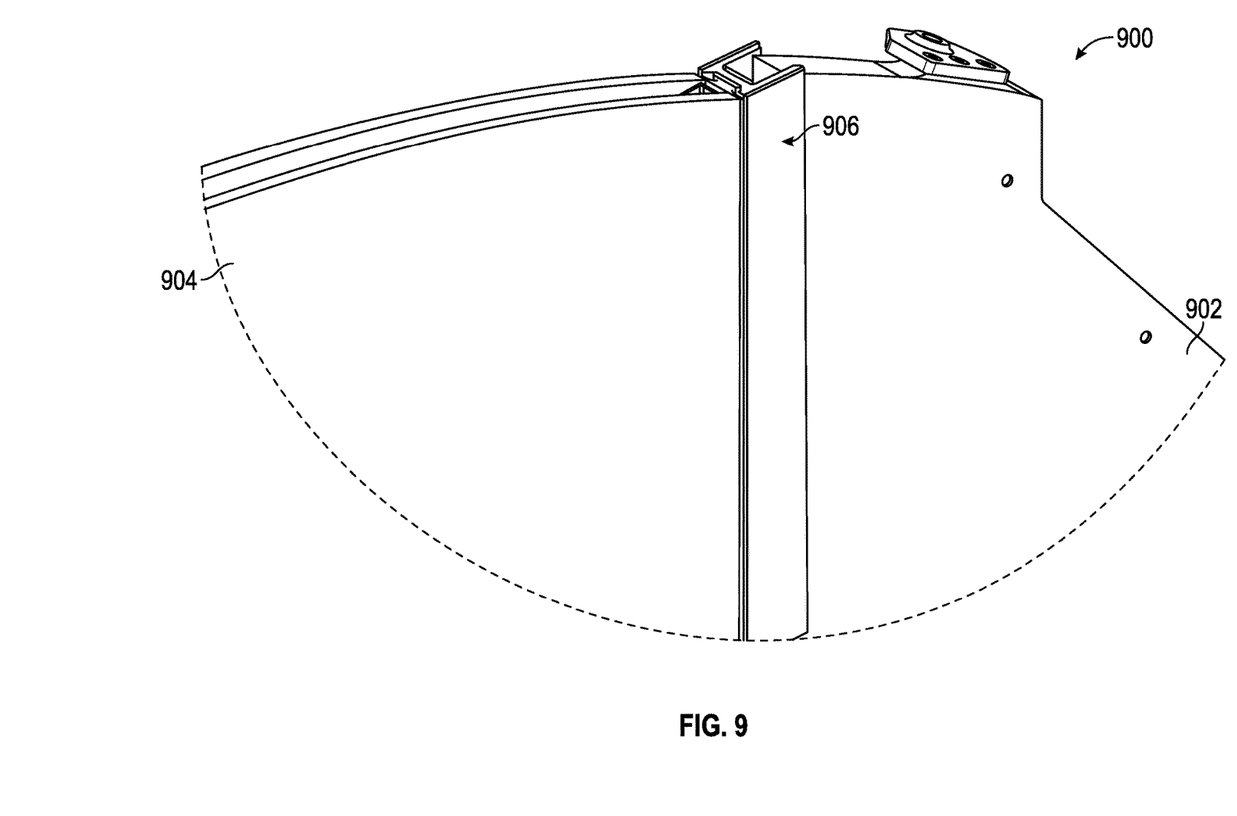
FIG. 9 is an illustration of a bulkhead and aircraft door in accordance with an exemplary implementation of a second disclosed embodiment.

FIG. 9 is an illustration of another non-limiting embodiment of a slidable bulkhead door system 900 that offers the advantages of the present invention. The embodiment illustrated in FIGS. 9-14 is referred to as a narrow door receiver since the self-adjusting door jamb attaches to an edge of the bulkhead and moves about or around the exterior sides of the bulkhead. The narrow door receiver is advantageous where narrower bulkheads are desired to maximize space of the aircraft passenger cabin. The slidable door system 900 includes a bulkhead 902 and a slidable door panel 904 that resides in an opening (or pocket) in the bulkhead when in the open position. When the slidable door panel 904 is in the closed position, an edge of the slidable door panel contacts a door jamb 906. According to exemplary embodiments, the door jamb 906 includes a bias mechanism that biases the door jamb to remain in contact with the edge of the slidable door panel during flight of the aircraft. Depending on the particular implementation, one or more of these bias mechanisms may be employed to maintain sufficient force across the length of contact (height of the door) to keep the door jamb 906 in contact with the slidable door panel 904 notwithstanding varying stress-induced forces that may be applied to the fuselage and/or bulkhead 902 during air travel.

Figure 10:
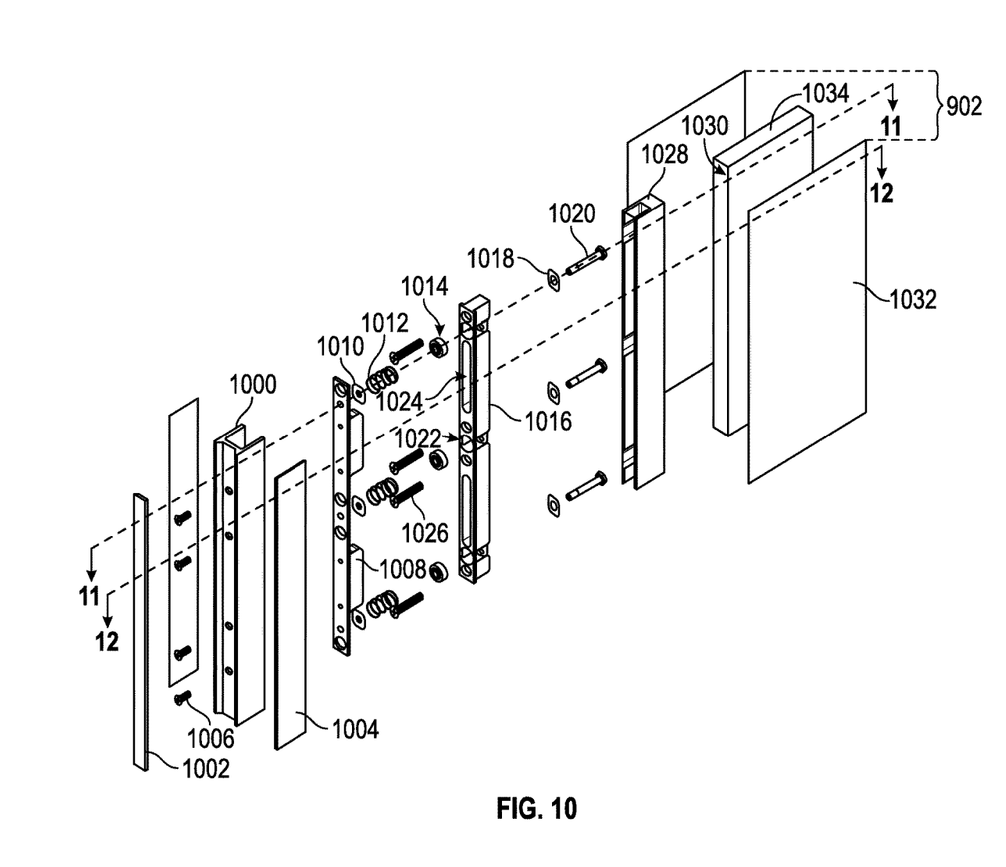
FIG. 10 is an exploded view of the self-adjusting door jamb in accordance with the second disclosed embodiment.

FIG. 10 is an exploded view of the self-adjusting door jamb 906 in accordance with the second disclosed embodiment. As illustrated in FIG. 10, the self-adjusting door jamb 906 includes a door jamb 1000, which may include a door seal 1002. Since the door jamb 1000 is visible, some embodiments include a veneer 1004. Since the door jamb 1000, door seal 1002 and veneer 1004 are visible when the self-adjusting door jamb 906 is installed, some embodiments make these elements decorative or made of a wood, composite or plastic material selected to match the interior trim of the aircraft. The door jamb 1000 is coupled to a guide mechanism 1008 by fasteners 1006. The guide mechanism 1008 facilities movement (port—starboard or Y axis) of the door jamb toward a receiver 1016 when the slidable door (not shown in FIG. 10) is in the closed position and compresses the door jamb 1000 against a biasing mechanism. In some embodiments, the biasing mechanism comprises a retainer 1010 and a spring/compression device 1012 that is received by the receiver 1016. As will be appreciated by those skilled in the art, other spring configurations, compressible bushing or other biasing arrangements may be employed without departing from the teachings of the present disclosure. Additionally, the receiver 1016 receives an angular translating mechanism 1014 that allows angular (up/down or Z axis) displacement of a fastener 1020 that couples the receiver 1016 to the door jamb 1100 via a washer 1018. In some embodiments, the angular translating mechanism 1014 comprises a spherical bearing residing in an opening 1022 in receiver 1016. The receiver 1016 is coupled to a retainer 1028 by fasteners 1026. In the narrow door receiver embodiment, the retainer 1028 is coupled to an edge 1030 of the bulkhead 902. In some embodiments, the bulkhead 902 comprises a panel 1034 and a veneer covering 1032 for an asthenic finish. The panel 1034 may be made of a "honeycomb" construction to provide sufficient rigidity while still reducing weight of the panel 1034.

Figure 11:
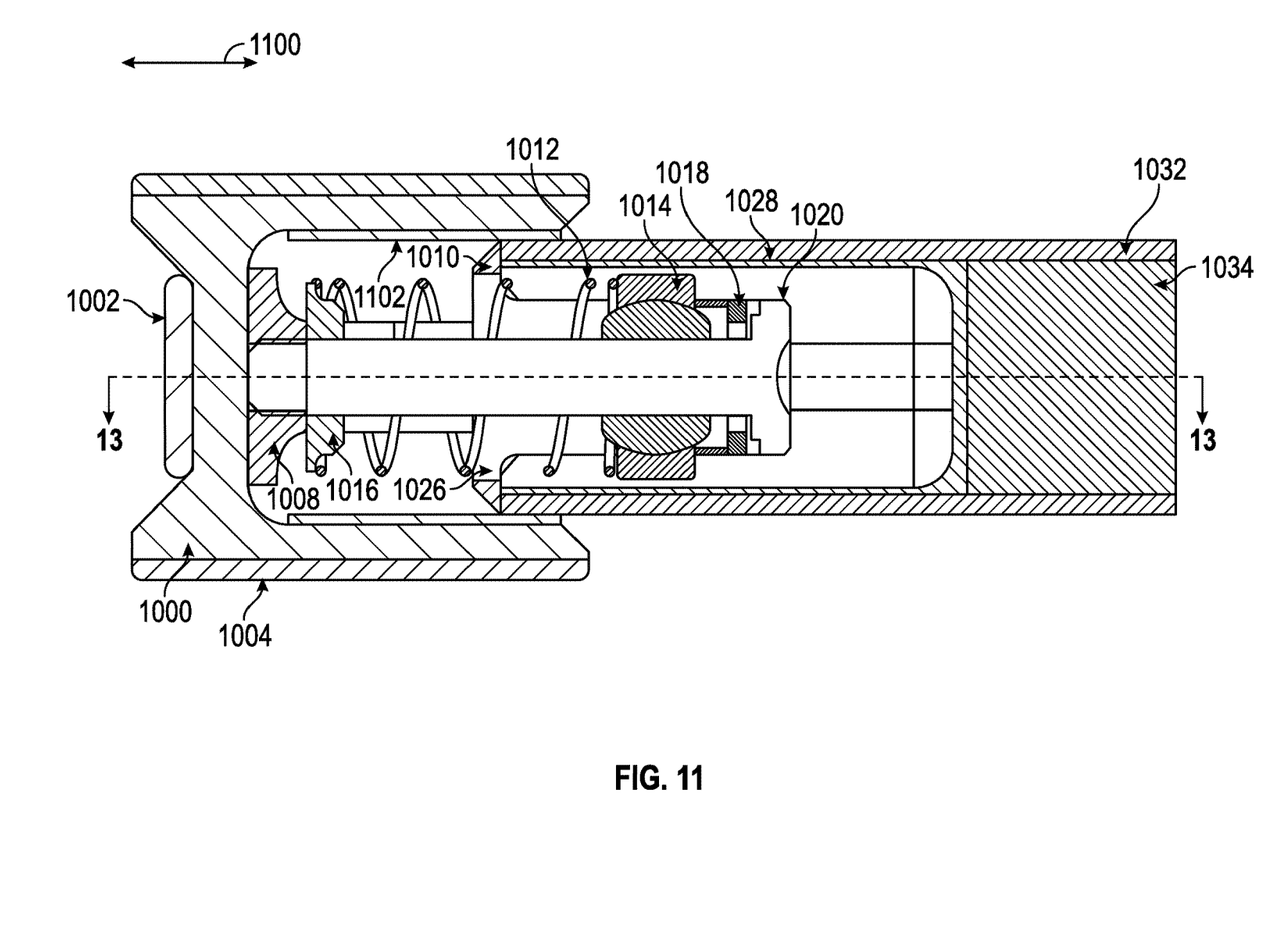
FIG. 11 is an assembled overhead view taken alone section line 11-11 of FIG. 10 with the self-adjusting door jamb in a first position in accordance with the second disclosed embodiment.

FIG. 11 is an assembled overhead view of the self-adjusting door jamb 906 taken alone section line 11-11 of FIG. 10 with the self-adjusting door jamb in a first (door open) position in accordance with the narrow door receiver embodiment. In operation, when the sliding door panel (904 in FIG. 9) moves toward the closed position and comes into contact with the door jamb 1000, the biasing mechanism 1012 is compressed to maintain contact with the sliding door panel during flight of the aircraft. The compression causes movement along an axis 1100 (port—starboard or Y axis) while the axial translating mechanism 1014 allows angular (up—down or Z axis; i.e., into and out of FIG. 11) displacement of the door jamb 1000 which is positioned about or around the exterior surface 1032 of the bulkhead 902 in the narrow door receiver embodiment. A cushioning or anti-scuff material 1102 is position along a mating edge of the door jamb 1000 that will not scratch or damage the veneer 1034 of the bulkhead 902. As will be appreciated by those skilled in the art, this action provides the self-adjusting door jamb 906 with multiple axes movement to compensate for stresses applied to the fuselage of the aircraft along two axes and resist the appearance of gaps forming between the sliding door panel (not shown in FIG. 11) and the door jamb 1000.

Figure 12:
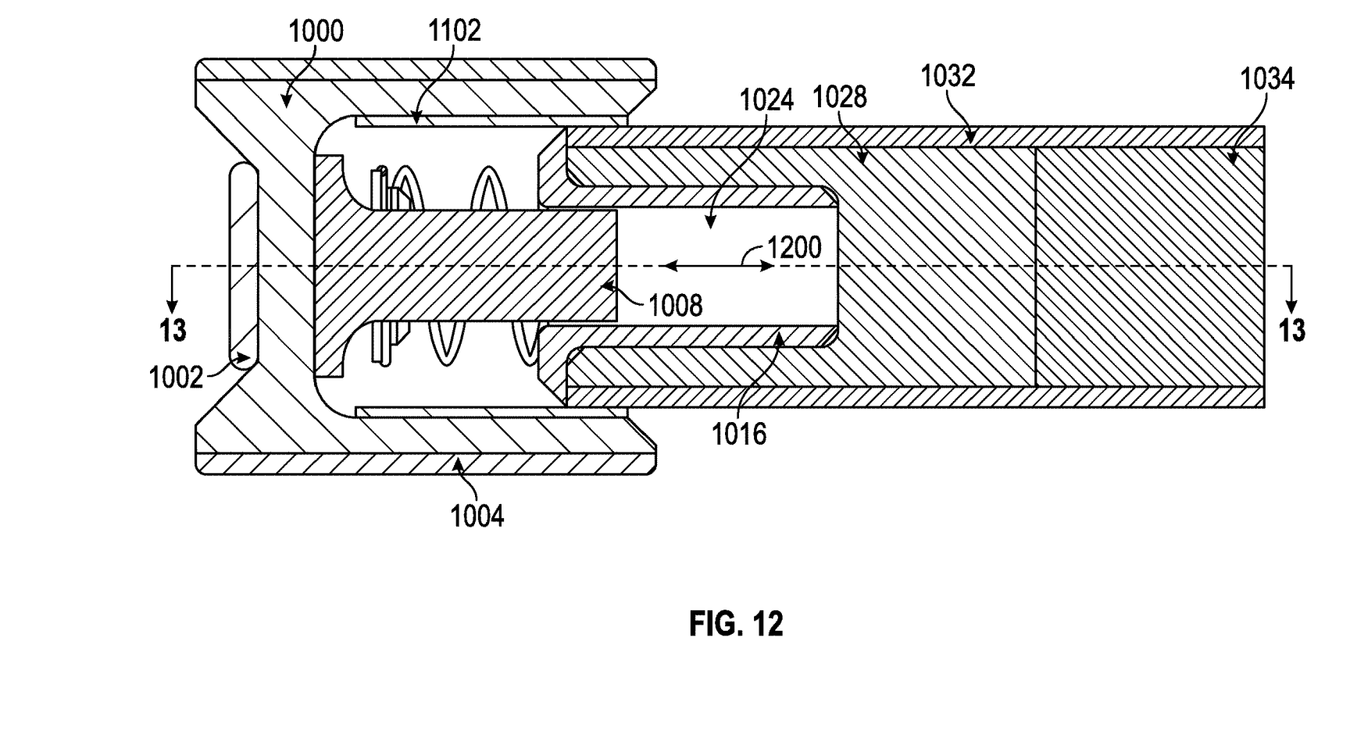
FIG. 12 is an assembled overhead view taken alone section line 12-12 of FIG. 10 with the self-adjusting door jamb in the first position in accordance with the second disclosed embodiment.

FIG. 12 is an assembled overhead view taken alone section line 12-12 of FIG. 10 to illustrate the guide feature of the narrow door receiver embodiment of the self-adjusting door jamb 906. As will be appreciated by those skilled in the art, the guide mechanism 1008 moves along an axis 1200 within an opening 1024 in the receiver 1016. This operates to maintain alignment of the door jamb 1000 to the receiver 1016 while permitting angular displacement of the door jamb 1000 during flight.

Figure 13:
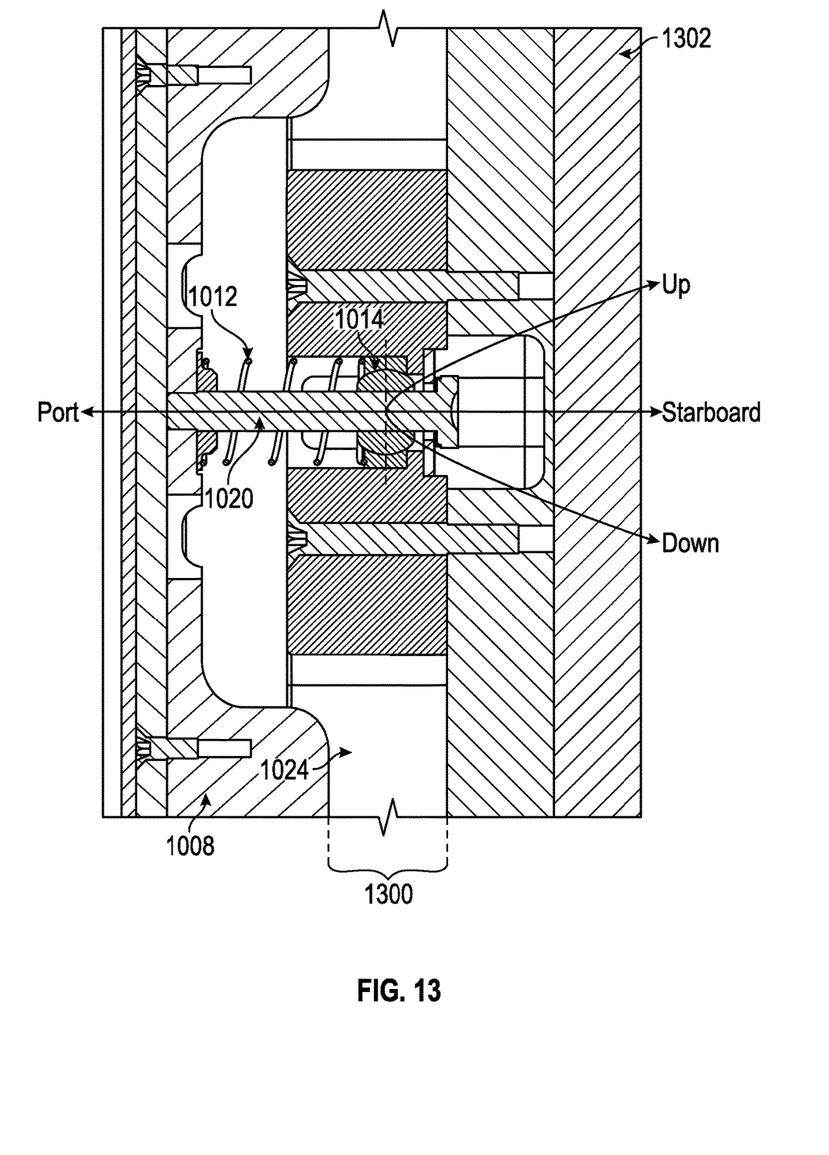
FIG. 13 is an assembled overhead view taken alone section line 13-13 of FIGS. 11 and 12 with the self-adjusting door jamb in the first position in accordance with the second disclosed embodiment.
Figure 14:
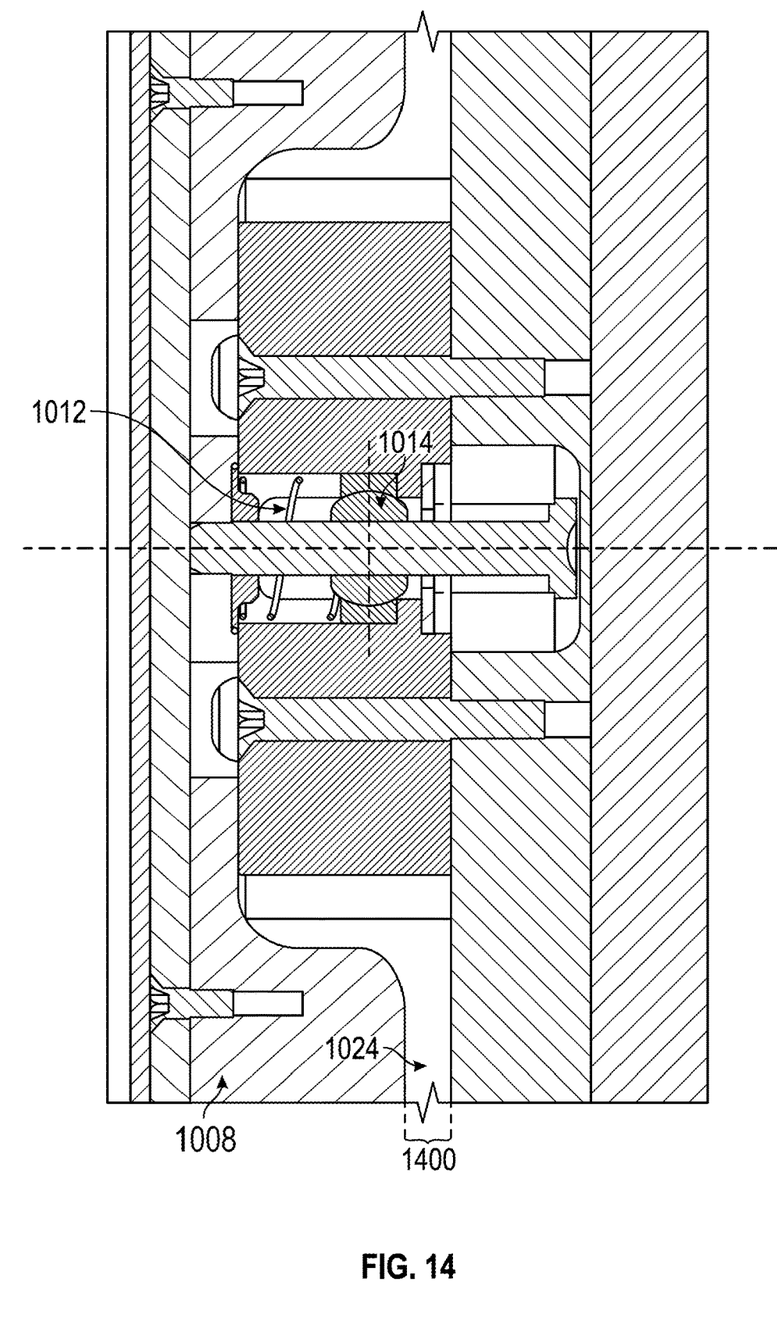
FIG. 14 is an assembled overhead view taken alone section line 13-13 of FIGS. 11 and 12 with the self-adjusting door jamb in a second position in accordance with the second disclosed embodiment.

FIG. 13 is an assembled overhead view taken alone section line 13-13 of FIG. 11 or 12 with the self-adjusting door jamb in the first (door open) position, while FIG. 14 the same sectional view with the self-adjusting door jamb in a second (door closed) position. As shown in FIG. 13, a distance 1300 is present in opening 1024 in the door open position which is compressed (port to starboard) as shown in FIG. 14 to a distance 1400 in the door closed position. While FIG. 14 illustrates only Y axis movement, it will be appreciated that during flight, the axial translating mechanism 1014 facilitates angular displacement of the door jamb 1000 providing two axis self-adjusting movement as shown by arrows 1302.

The disclosed embodiments can provide an aircraft with an improved aircraft door system that resists the appearance of gaps between the door and the door jamb of an interior passenger cabin during flight. This improves aesthetics within the passenger cabin and offers passengers more privacy than conventional pocket door systems used on aircraft.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other through one or more additional elements.

While at least one exemplary embodiment has been presented in the foregoing detailed description, it should be appreciated that a vast number of variations exist. For example, although the disclosed embodiments are described with reference to a door used on an aircraft, those skilled in the art will appreciate that the disclosed embodiments could be implemented in other types of vehicles. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. A self-adjusting door jamb for an interior door, comprising:
   a door jamb positioned in a recess in a bulkhead and configured to receive an edge of the interior door as it slides from an open position to a closed position wherein the edge of the interior door comes into contact with the door jamb and moves the door jamb into the recess in the closed position;
a bias mechanism within the recess and coupled to the door jamb, the bias mechanism being compressed as the door jamb moves into the recess while facilitating movement of the door jamb along an axis to maintain the edge of the interior door in contact with the door jamb in the closed position; and
an angular translating mechanism within the recess and coupled to the door jamb and facilitating angular displacement of the door jamb relative to the axis to maintain the edge of the interior door in contact with the door jamb in the closed position.

2. The self-adjusting door jamb of claim 1, wherein the interior door comprises a sliding door of a pocket door system.

3. The self-adjusting door jamb of claim 1, wherein the biasing mechanism comprises a spring member or compressible bushing.

4. The self-adjusting door jamb of claim 3, wherein the spring member or compressible bushing is coupled to a retainer.

5. The self-adjusting door jamb of claim 1, wherein the angular translating mechanism further comprises a spherical bearing.

6. The self-adjusting door jamb of claim 1, further comprising a door jamb receiver configured to be coupled to a bulkhead and receiving the bias mechanism.

7. The self-adjusting door jamb of claim 1, further comprising a plurality of the bias mechanisms and the angular translating mechanisms coupled to the door jamb at spaced apart locations.

8. The interior door system of claim 1, further comprising a plurality of the bias mechanisms and the angular translating mechanisms coupled to the door jamb at spaced apart locations.

9. The interior door system of claim 1, wherein the door jamb is positioned within an opening the bulkhead and the door jamb moves within the opening.

10. The interior door system of claim 1, wherein the door jamb is coupled to an edge of the bulkhead and the door jamb moves about external surfaces of the bulkhead.

11. An interior door system having an interior door and a self-adjusting door jamb, comprising:
a bulkhead having a recess for receiving a door jamb receiver;
a door jamb configured to receive an edge of the interior door as it slides from an open position to a closed position wherein the edge of the interior door comes into contact with the door jamb and moves the door jamb into the recess in the closed position;
a bias mechanism within the recess and coupled to the door jamb and door jamb receiver, the bias mechanism being compressed as the door jamb moves into the recess while facilitating movement of the door jamb along an axis to maintain the edge of the interior door in contact with the door jamb in the closed position; and
an angular translating mechanism within the recess and coupled to the bias mechanism and facilitating angular displacement of the door jamb relative to the axis to maintain the edge of the interior door in contact with the door jamb in the closed position.

12. The interior door system of claim 11, wherein the interior door comprises a sliding door of a pocket door system.

13. The interior door system of claim 11, wherein the biasing mechanism comprises a spring member or compressible bushing.

14. The interior door system of claim 13, wherein the spring member or compressible bushing is coupled to a retainer.

15. The interior door system of claim 11, wherein the angular translating mechanism further comprises a spherical bearing.

16. A vehicle, comprising:
one or more engines for propelling the vehicle;
a passenger cabin;
one or more bulkheads within the passenger cabin;
at least one of the one or more bulkheads having a first opening therein for receiving a slideable door panel and a second opening therein for receiving a door jamb receiver;
a door jamb configured to receive an edge of the slidable door panel as it slides from an open position to a closed position wherein the edge of the interior door comes into contact with the door jamb and moves the door jamb into the second opening in the closed position;
a plurality of bias mechanisms each positioned within the second opening and coupled to the door jamb and door jamb receiver, the plurality of bias mechanisms being compressed as the door jamb moves into the second opening while facilitating movement of the door jamb along an axis; and
a plurality of angular translating mechanisms each positioned within the second opening and respectively coupled to one of the plurality of bias mechanisms and facilitating angular displacement of the door jamb relative to the axis;
wherein, the movement of the door jamb along the axis and the angular displacement of the door jamb maintain contact between the slideable door panel and the door jamb despite forces applied to the bulkhead.

17. The aircraft of claim 16, wherein each of the plurality of biasing mechanisms comprise a spring member.

18. The aircraft of claim 17, wherein the spring member is coupled to a spring retainer.

19. The aircraft of claim 16, wherein each of the plurality of angular translating mechanisms further comprise a spherical bearing.

20. A vehicle, comprising:
one or more engines for propelling the vehicle;
a passenger cabin;
one or more bulkheads within the passenger cabin;
at least one of the one or more bulkheads having a first opening therein for receiving a slideable door panel and a surface for receiving a door jamb receiver;
a door jamb configured to receive an edge of the slidable door panel as it slides from an open position to a closed position wherein the door jamb has a first position when the edge of the interior door comes into contact with the door jamb and moves the door jamb into a second position when the interior door is in the closed position;
a plurality of bias mechanisms each positioned within the door jamb receiver and coupled to the door jamb, the plurality of bias mechanisms being compressed as the door jamb moves into the second position while facilitating movement of the door jamb along an axis; and
a plurality of angular translating mechanisms each positioned within the door jamb receiver and respectively coupled to one of the plurality of bias mechanisms and facilitating angular displacement of the door jamb relative to the axis;

wherein, the movement of the door jamb along the axis and the angular displacement of the door jamb maintain contact between the slideable door panel and the door jamb despite forces applied to the bulkhead.

\* \* \* \* \*